(12) United States Patent
Mostafavi

(10) Patent No.: US 10,692,240 B2
(45) Date of Patent: Jun. 23, 2020

(54) SYSTEMS AND METHODS FOR DETECTING A POSSIBLE COLLISION BETWEEN AN OBJECT AND A PATIENT IN A MEDICAL PROCEDURE

(71) Applicant: VARIAN MEDICAL SYSTEMS, INC., Palo Alto, CA (US)

(72) Inventor: Hassan Mostafavi, Los Altos, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 0 days.

(21) Appl. No.: 13/926,912

(22) Filed: Jun. 25, 2013

(65) Prior Publication Data

US 2014/0376790 A1    Dec. 25, 2014

(51) Int. Cl.
*G06T 7/73*        (2017.01)

(52) U.S. Cl.
CPC ............ *G06T 7/74* (2017.01); *G06T 2200/04* (2013.01); *G06T 2207/10028* (2013.01); *G06T 2207/30004* (2013.01); *G06T 2207/30196* (2013.01)

(58) Field of Classification Search
CPC .............. G06T 2210/41; G06T 7/0012; G06T 2207/10081; G06T 11/005; G02B 21/22; G02B 21/367; A61B 6/032
See application file for complete search history.

(56) References Cited

U.S. PATENT DOCUMENTS

| | | | |
|---|---|---|---|
| 6,272,368 B1 | 8/2001 | Alexandrescu | |
| 6,504,899 B2 | 1/2003 | Pugachev et al. | |
| 6,735,277 B2 | 5/2004 | McNutt et al. | |
| 7,245,698 B2 | 7/2007 | Pang et al. | |
| 7,268,358 B2 | 9/2007 | Ma et al. | |
| 7,428,296 B2 | 9/2008 | Bernhardt et al. | |
| 7,529,339 B2 | 5/2009 | Goldman et al. | |
| 7,773,723 B2 | 8/2010 | Nord et al. | |
| 7,835,494 B2 | 11/2010 | Nord et al. | |
| 8,175,892 B2 | 5/2012 | Kapoor et al. | |
| 8,986,186 B2 | 3/2015 | Zhang et al. | |
| 9,211,423 B2 | 12/2015 | Gross et al. | |
| 2004/0042583 A1 | 3/2004 | Wackerle et al. | |

(Continued)

FOREIGN PATENT DOCUMENTS

| CN | 200984237 Y | 12/2007 |
|---|---|---|
| DE | 10 2007 003 876 B3 | 7/2008 |

(Continued)

OTHER PUBLICATIONS

International Search Report and Written Opinion dated Dec. 15, 2014 for corresponding PCT Patent Application No. PCT/US2014/044144, 18 pages.

(Continued)

*Primary Examiner* — Menatoallah Youssef
(74) *Attorney, Agent, or Firm* — Vista IP Law Group, LLP

(57) ABSTRACT

A method of detecting a possible collision in a medical procedure, includes: obtaining a reference depth image; obtaining an input depth image; determining a composite image using at least a part of the reference depth image and at least a part of the input depth image, wherein the act of determining the composite image is performed using a processing unit; and determining whether there is a possible collision between an object and a patient based on the composite image.

41 Claims, 8 Drawing Sheets

(56) References Cited

U.S. PATENT DOCUMENTS

| | | | |
|---|---|---|---|
| 2006/0274888 A1* | 12/2006 | Bernhardt | A61B 6/102 378/117 |
| 2009/0292309 A1* | 11/2009 | Maschke | 606/213 |
| 2011/0150271 A1 | 6/2011 | Lee et al. | |
| 2012/0182392 A1 | 7/2012 | Kearns et al. | |
| 2012/0271094 A1 | 10/2012 | Fuller | |
| 2013/0083894 A1 | 4/2013 | Niebler et al. | |
| 2013/0142310 A1 | 6/2013 | Fahimian et al. | |
| 2014/0376790 A1 | 12/2014 | Mostafavi | |
| 2015/0035942 A1 | 2/2015 | Hampton et al. | |
| 2015/0208999 A1 | 7/2015 | Steinfeld et al. | |
| 2015/0324967 A1 | 11/2015 | Newell et al. | |

FOREIGN PATENT DOCUMENTS

| | | | |
|---|---|---|---|
| DE | 102007003876 | * | 7/2008 |
| DE | 102007003876 B3 * | 7/2008 | A61B 6/102 |
| DE | 102007003876 B3 * | 7/2008 | A61B 6/102 |
| DE | 10 2008 046 345 B4 | | 7/2010 |
| DE | 10 2011 084 444 A1 | | 4/2013 |
| DE | 102011084444 | * | 4/2013 |
| DE | 102011084444 A1 * | 4/2013 | A61B 6/102 |
| DE | 102011084444 A1 * | 4/2013 | A61B 6/102 |
| DE | 10 2012 203 767 A1 | | 7/2013 |
| JP | 2014-128352 | | 7/2014 |
| WO | WO 2011/153639 A2 | | 12/2011 |
| WO | WO 2015/017630 A1 | | 2/2015 |
| WO | WO 2015/017639 A1 | | 2/2015 |
| WO | WO 2016/014422 A1 | | 1/2016 |

OTHER PUBLICATIONS

Extended European Search Report dated Feb. 16, 2017 for corresponding EP Patent Application No. 14816623.4, 8 pages.

David E. Breen et al., "Interactive Occlusion and Collison of Real and Virtual Objects in Augmented Reality", Technical Report ECRC-95-02, Jan. 1, 1995, 22 pages.

Japanese Office Action dated Sep. 10, 2018 for corresponding Japanese Patent Application No. 2016-521912.

European Office Action dated Apr. 15, 2019 for corresponding European Patent Application No. 148166234.

First Chinese Office Action dated Dec. 2, 2016 for corresponding Patent Application No. 2014800326201.

Second Chinese Office Action dated Jun. 28, 2017 for corresponding Patent Application No. 2014800326201.

Zhang, Y., "Image Understanding", Third Edition, (Aug. 2000).

* cited by examiner

SYSTEMS AND METHODS FOR DETECTING A POSSIBLE COLLISION BETWEEN AN OBJECT AND A PATIENT IN A MEDICAL PROCEDURE

FIELD

The field of the application relates to systems and methods for detecting a possible collision between an object and a patient during a medical procedure, wherein the object may be a part of a medical device.

BACKGROUND

Radiation therapy involves medical procedures that selectively expose certain areas of a human body, such as cancerous tumors, to high doses of radiation. The intent of the radiation therapy is to irradiate the targeted biological tissue such that the harmful tissue is destroyed. During a radiation therapy, a radiation source may be rotated around a patient to deliver radiation from different angles at target region inside the patient. The radiation source may be mounted on an arm or a ring gantry. In certain radiation therapy, the patient support supporting the patient may also be moved. Despite careful treatment planning, during a medical procedure, a collision may occur between a moving part of a medical device and a patient. For example, the gantry of the radiation machine and the patient may possibly collide during radiation therapy. As the dose delivery plans become more complex, the combination of a rotating gantry during treatment and couch movement for non-coplanar beams delivery has increased the chance of collisions.

While gantry mounted laser guard system and room mounted scanners have been used to detect possible collisions, these methods have disadvantages. While a gantry mounted laser guard system has the ability to detect when a plane defined by laser scanning is intersected by an intruding object, it does not work in many situations where the couch is rotated.

In the case of a room-based scanning system, a room mounted scanner creates a profile of the patient on the couch and the profile is added to the knowledge base of the machine with software that keeps track of machine parts movement. A room-based scanning system is model-based and thus requires that the model be updated with every couch movement. In addition, from certain angles the scanner may not be able to re-profile the patient.

Applicant of the subject application determines that it may be desirable to develop a collision avoidance system that functions irrespective of the position and movement of the couch and other parts of the medical device.

SUMMARY

A method of detecting a possible collision in a medical procedure, includes: obtaining a reference depth image; obtaining an input depth image; determining a composite image using at least a part of the reference depth image and at least a part of the input depth image, wherein the act of determining the composite image is performed using a processing unit; and determining whether there is a possible collision between an object and a patient based on the composite image.

Optionally, the reference depth image is generated based on a time-of-flight technique.

Optionally, the reference depth image is generated using infrared illumination.

Optionally, the act of obtaining the reference depth image and the input depth image are performed by the processing unit receiving the reference depth image and the input depth image.

Optionally, the method further includes generating the reference depth image using a depth sensing camera.

Optionally, the input depth image comprises a real-time depth image obtained using a depth sensing camera.

Optionally, the depth sensing camera is mounted so that its position relative to a patient support is fixed, and is viewing the patient from the foot-to-head direction.

Optionally, the act of determining the composite image comprises performing a subtraction using the at least a part of the reference depth image and the at least a part of the input depth image.

Optionally, the method further includes identifying an outline of the patient in the reference depth image.

Optionally, the method further includes determining a detection zone based on an outline of the patient in the reference depth image.

Optionally, the part of the at least a part of the reference depth image comprises image data in the detection zone.

Optionally, the act of determining whether there is a possible collision comprises determining whether a value of an image data in the composite image is greater or less than a threshold.

Optionally, the method further includes obtaining a visible image of the patient.

Optionally, the method further includes displaying the visible image together with the composite image in a screen.

Optionally, the act of determining whether there is a possible collision between the object and the patient is based on both the composite image and the visible image.

Optionally, the method further includes obtaining an infrared image.

Optionally, the method further includes displaying the infrared image together with the composite image in a screen.

Optionally, the act of determining whether there is a possible collision between the object and the patient is based on both the composite image and the infrared image.

Optionally, the method further includes generating a warning signal, generating a control signal to stop an operation of a medical device, or both, in response to the determined possible collision.

Optionally, the method further includes: obtaining an additional reference depth image; obtaining an additional input depth image; and determining an additional composite image using at least a part of the additional reference depth image and at least a part of the additional input depth image.

Optionally, the reference depth image and the input depth image are generated using a first depth sensing camera, and the additional reference depth image and the additional input depth are generated using a second depth sensing camera.

Optionally, the method further includes generating the reference depth image using a depth sensing camera that is mounted to a patient support.

Optionally, the act of determining whether there is a possible collision comprises using an intrusion detection zone, wherein a shape of the intrusion detection zone is independent of a movement of a patient support supporting the patient.

An apparatus for detecting a possible collision in a medical procedure, includes: a depth sensing camera for providing a reference depth image, and an input depth image; and a processing unit configured for: determining a composite image using at least a part of the reference depth image and at least a part of the input depth image, and determining whether there is a possible collision between an object and a patient based on the composite image.

Optionally, the depth sensing camera is configured to generate the reference depth image based on a time-of-flight technique.

Optionally, the depth sensing camera is configured to generate the reference depth image using infrared illumination.

Optionally, the processing unit is configured to use the input depth image as a real-time depth image.

Optionally, the apparatus further includes a securing mechanism for securing the depth sensing camera in a fixed position relative to a patient support, wherein the depth sensing camera is oriented for viewing the patient from the foot-to-head direction.

Optionally, the processing unit is configured for determining the composite image by performing a subtraction using the at least a part of the reference depth image and the at least a part of the input depth image.

Optionally, the processing unit is further configured for identifying an outline of the patient in the reference depth image.

Optionally, the processing unit is further configured for determining a detection zone based on an outline of the patient in the reference depth image.

Optionally, the at least a part of the reference depth image comprises image data in the detection zone.

Optionally, the processing unit is configured for determining whether there is a possible collision by determining whether a value of an image data in the composite image is greater or less than a threshold.

Optionally, the processing unit is also configured to obtain a visible image of the patient.

Optionally, the processing unit is configured to output both the visible image and the composite image for display on a screen.

Optionally, the processing unit is configured for determining whether there is a possible collision between the object and the patient based on both the composite image and the visible image.

Optionally, the processing unit is also configured to obtain an infrared image.

Optionally, the processing unit is configured to output both the infrared image and the composite image for display on a screen.

Optionally, the processing unit is configured for determining whether there is a possible collision between the object and the patient based on both the composite image and the infrared image.

Optionally, the processing unit is further configured for generating a warning signal, generating a control signal to stop an operation of a medical device, or both, in response to the determined possible collision.

Optionally, the apparatus further includes an additional depth measuring camera for generating an additional reference depth image and an additional input depth image; wherein the processing unit is configured for determining an additional composite image using at least a part of the additional reference depth image and at least a part of the additional input depth image.

Optionally, the depth sensing camera is mounted to a patient support.

Optionally, the processing unit is configured to use an intrusion detection zone to determine whether there is a possible collision between the object and the patient, and wherein a shape of the intrusion detection zone is independent of a movement of a patient support supporting the patient.

A computer product includes a non-transitory medium storing a set of instructions, an execution of which by a processing unit causes a method for detecting a possible collision in a medical procedure to be performed, the method comprising: obtaining a reference depth image; obtaining an input depth image; determining a composite image using at least a part of the reference depth image and at least a part of the input depth image; and determining whether there is a possible collision between an object and a patient based on the composite image.

A method of detecting a possible collision in a medical procedure, includes: obtaining a reference depth image; using the reference depth image to determine a region of interest; obtaining a reference optical image; obtaining an input optical image; determining a composite image using the reference optical image and the input optical image, wherein the act of determining the composite image is performed using a processing unit; and determining whether there is a possible collision between an object and a patient based on at least a part of the composite image that corresponds with the region of interest.

Optionally, the reference optical image comprises a reference infrared image.

Optionally, the act of determining the composite image comprises performing an image subtraction.

Optionally, the act of determining whether there is a possible collision comprises determining whether an absolute value of a pixel in the composite image exceeds a threshold.

Optionally, the pixel in the composite image corresponds to a position in the region of interest.

Optionally, a shape of the region of interest is independent of a movement of a patient support supporting the patient.

A system for detecting a possible collision in a medical procedure, includes: a depth sensing camera for obtaining a reference depth image; an optical camera for obtaining a reference optical image, and obtaining an input optical image; and a processing unit configured for using the reference depth image to determine a region of interest, determining a composite image using the reference optical image and the input optical image, and determining whether there is a possible collision between an object and a patient based on at least a part of the composite image that corresponds with the region of interest.

Optionally, the reference optical image comprises a reference infrared image.

Optionally, the processing unit is configured to perform an image subtraction to determine the composite image.

Optionally, the processing unit is configured to determine whether an absolute value of a pixel in the composite image exceeds a threshold.

Optionally, the pixel in the composite image corresponds to a position in the region of interest.

Optionally, a shape of the region of interest is independent of a movement of a patient support supporting the patient.

A computer product includes a non-transitory medium storing a set of instructions, an execution of which by a processing unit causes a method for detecting a possible collision in a medical procedure to be performed, the method comprising: obtaining a reference depth image; using the reference depth image to determine a region of interest; obtaining a reference optical image; obtaining an input optical image; determining a composite image using the reference optical image and the input optical image; and determining whether there is a possible collision between an object and a patient based on at least a part of the composite image that corresponds with the region of interest.

Other and further aspects and features will be evident from reading the following detailed description.

DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only exemplary embodiments and are not therefore to be considered limiting in the scope of the claims.

DETAILED DESCRIPTION

Figure 1A:
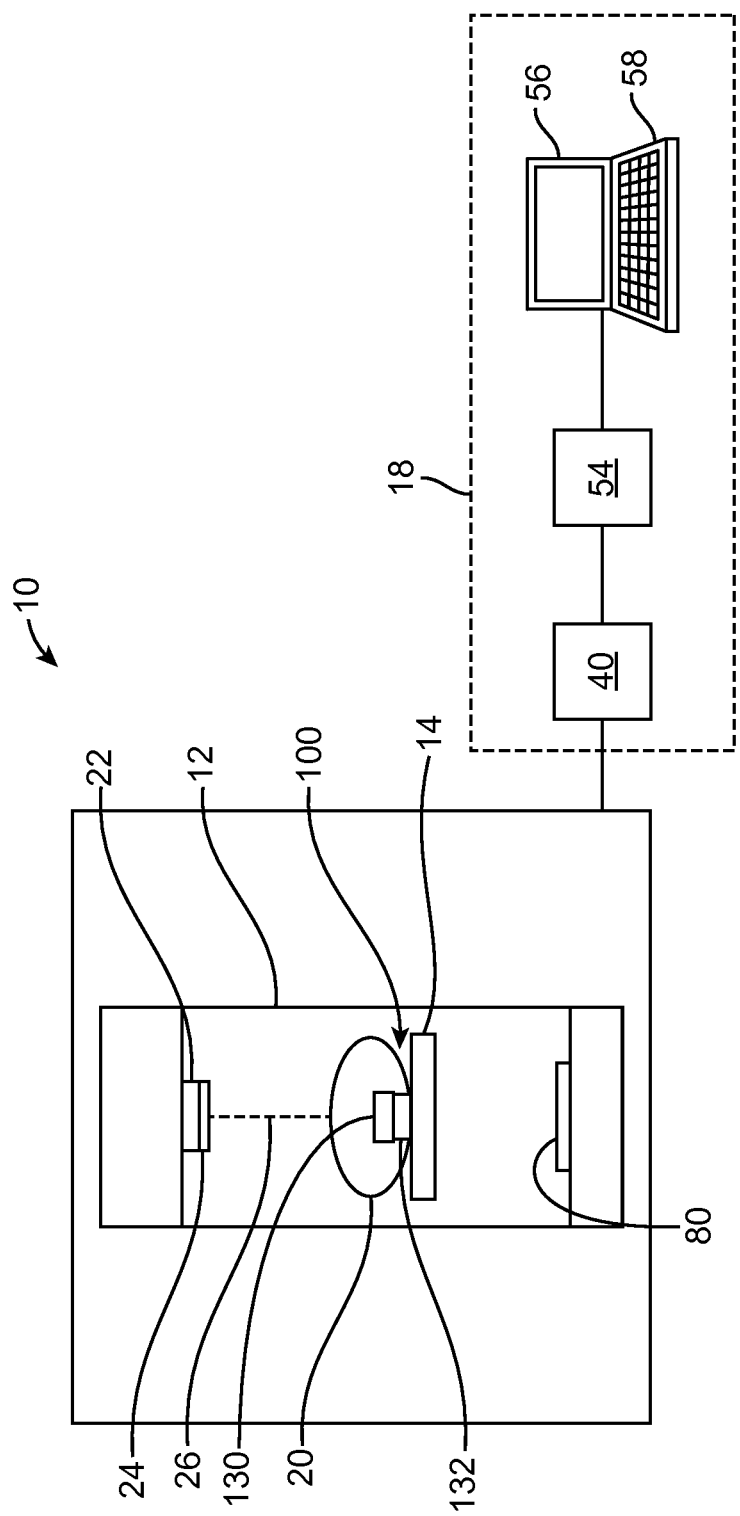
FIG. 1A illustrates a radiation treatment system configured for detecting possible collision between a moving part of a medical device and a patient during a medical procedure in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1A illustrates a radiation treatment system 10. The system 10 includes an arm gantry 12, a patient support 14 for supporting a patient 20, and a control system 18 for controlling an operation of the gantry 12 and delivery of radiation. The system 10 also includes a radiation source 22 that projects a beam 26 of radiation towards the patient 20 while the patient 20 is supported on support 14, and a collimator system 24 for changing a cross sectional shape of the radiation beam 26. The radiation source 22 may be configured to generate a cone beam, a fan beam, or other types of radiation beams in different embodiments. Also, in other embodiments, the source 22 may be configured to generate proton beam as a form of radiation for treatment purpose. Also, in other embodiments, the system 10 may have other form and/or configuration. For example, in other embodiments, instead of an arm gantry 12, the system 10 may have a ring gantry 12.

In the illustrated embodiments, the radiation source 22 is a treatment radiation source for providing treatment energy. In other embodiments, in addition to being a treatment radiation source, the radiation source 22 can also be a diagnostic radiation source for providing diagnostic energy for imaging purpose. In such cases, the system 10 will include an imager, such as the imager 80, located at an operative position relative to the source 22 (e.g., under the support 14). In further embodiments, the radiation source 22 may be a treatment radiation source for providing treatment energy, wherein the treatment energy may be used to obtain images. In such cases, in order to obtain imaging using treatment energies, the imager 80 is configured to generate images in response to radiation having treatment energies (e.g., MV imager). In some embodiments, the treatment energy is generally those energies of 160 kilo-electron-volts (keV) or greater, and more typically 1 mega-electron-volts (MeV) or greater, and diagnostic energy is generally those energies below the high energy range, and more typically below 160 keV. In other embodiments, the treatment energy and the diagnostic energy can have other energy levels, and refer to energies that are used for treatment and diagnostic purposes, respectively. In some embodiments, the radiation source 22 is able to generate X-ray radiation at a plurality of photon energy levels within a range anywhere between approximately 10 keV and approximately 20 MeV. In further embodiments, the radiation source 22 can be a diagnostic radiation source. In such cases, the system 10 may be a diagnostic system with one or more moving parts. In the illustrated embodiments, the radiation source 22 is carried by the arm gantry 12. Alternatively, the radiation source 22 may be located within a bore (e.g., coupled to a ring gantry).

In the illustrated embodiments, the control system 18 includes a processing unit 54, such as a processor, coupled to a control 40. The control system 18 may also include a monitor 56 for displaying data and an input device 58, such as a keyboard or a mouse, for inputting data. The operation of the radiation source 22 and the gantry 12 are controlled by the control 40, which provides power and timing signals to the radiation source 22, and controls a rotational speed and position of the gantry 12, based on signals received from the processing unit 54. Although the control 40 is shown as a separate component from the gantry 12 and the processing unit 54, in alternative embodiments, the control 40 can be a part of the gantry 12 or the processing unit 54.

In some embodiments, the system 10 may be a treatment system configured to deliver treatment radiation beam towards the patient 20 at different gantry angles. During a treatment procedure, the source 22 rotates around the patient 20 and delivers treatment radiation beam from different gantry angles towards the patient 20. While the source 22 is at different gantry angles, the collimator 24 is operated to change the shape of the beam to correspond with a shape of the target tissue structure. For example, the collimator 24 may be operated so that the shape of the beam is similar to a cross sectional shape of the target tissue structure. In another example, the collimator 24 may be operated so that different portions of the target tissue structure receive different amount of radiation (as in an IMRT procedure).

Figure 1B:
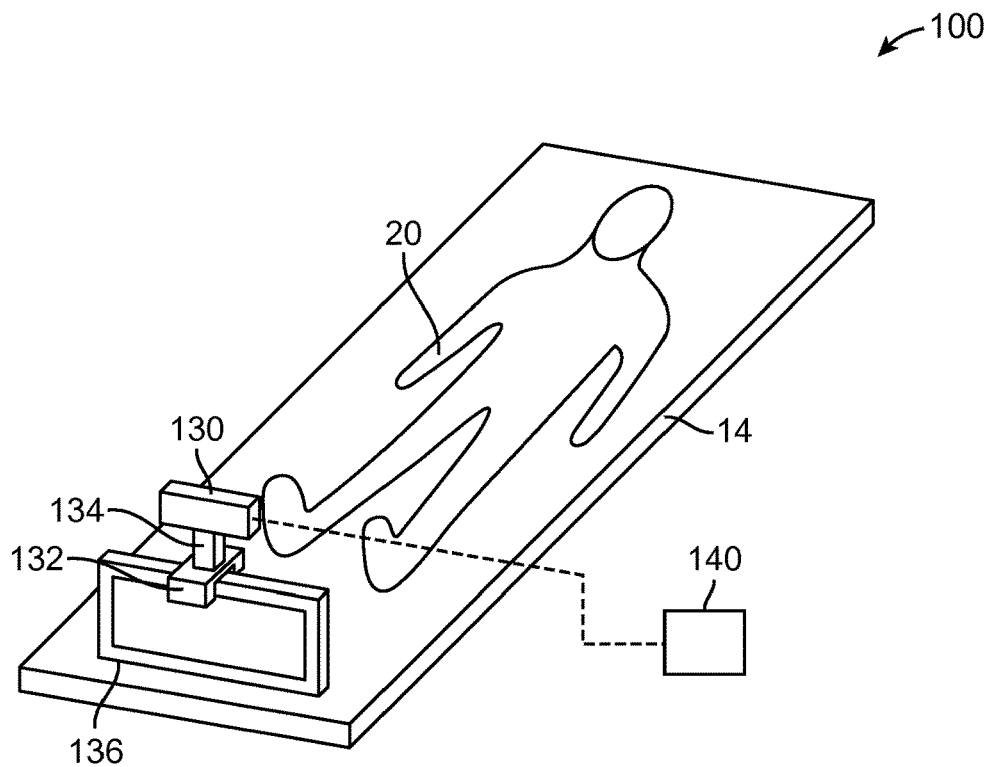
FIG. 1B illustrates a system for detecting a possible collision.

As shown in FIGS. 1A and 1B, the medical system 10 also includes a collision detection system 100, which includes a depth measuring camera 130, a securing mechanism 132 for securing the depth measuring camera 130 relative to an object, and a support 134.

The depth sensing camera 130 is configured to sense depths and to generate signals representing the depths. In some embodiments, the depth sensing camera 130 may use structured light for depth measurement (e.g., a Kinect camera). In other embodiments, the depth sensing camera 130 may use time-of-flight method for depth measurement (e.g., Mesa SR4000, or the new Microsoft Kinect2 camera). In further embodiments, the depth sensing camera 130 may be any device that is capable of sensing depth using any known techniques. It should be noted that the term "camera", as used in this specification, may be any device, and should not be limited to a device that provides "image" signals. For example, in some embodiments, the depth sensing camera 130 may be configured to provide depth signals, which may or may not be considered image signals, regardless of whether such depth signals are displayed in image form or not. A depth signal may be any signal indicating a depth or distance, or any signal from with a depth or distance may be derived. By means of non-limiting examples, the signal may be an infrared signal, an ultrasound signal, etc. In some embodiments, the dimensions of the depth sensing camera 130 may be small enough to be non-intrusive to the treatment process when mounted during use. For example, in some embodiments, the camera 130 may have a dimension of 11 inch×2.5 inch×1.5 inch. In other embodiments, the camera 130 may have other dimensions, such as those larger or smaller than the example provided above, as long as the use of the camera 130 does not interfere with the treatment procedure.

Also, in some embodiments, the depth sensing camera 130 may be infrared-based, in which cases, the depth may be sensed by the camera 130 using infrared. In some embodiments, such depth sensing camera 130 may be configured to output infrared video images from which depth images are formed. In some embodiments, these infrared video images may have exactly the same field of view as the depth images. Thus, the infrared video images may be used together with the depth images to determine whether there is a possible collision.

Furthermore, in some embodiments, the depth sensing camera 130 may include an infrared emitter, a color sensor, and an infrared depth sensor. The infrared depth sensor is configured to sense depth based on infrared signals output by the infrared emitter. The color sensor is configured to sense visible image.

In some embodiments, the depth sensing camera 130 may have a detection (or frame) rate of 30 per second or higher. In other embodiments, the detection/frame rate may be less than 30 per second.

The support 134 may be a post, a bracket, a beam, an arm, etc., for supporting the depth sensing camera 130. The securing mechanism 132 may be located at the support 134. Also, in some embodiments, the support 134 may optionally have one or more moveable parts to allow a position and/or an orientation of the depth sensing camera 130 to be adjusted relative to the support 14 (or relative to the patient 20 or another reference location). In some embodiments, the support 134 itself may be movable relative to the support 14 in order to adjust the camera position (e.g., longitudinally) relative to the patient. In further embodiments, the support 134 may be a base with a tilt motor, which allows the camera 130 to be tilted in one, two, or three, degrees of movement relative to the base. In other embodiments, the support 134 is not needed, and the collision detection system 1000 may not include the support 134.

Figure 1C:
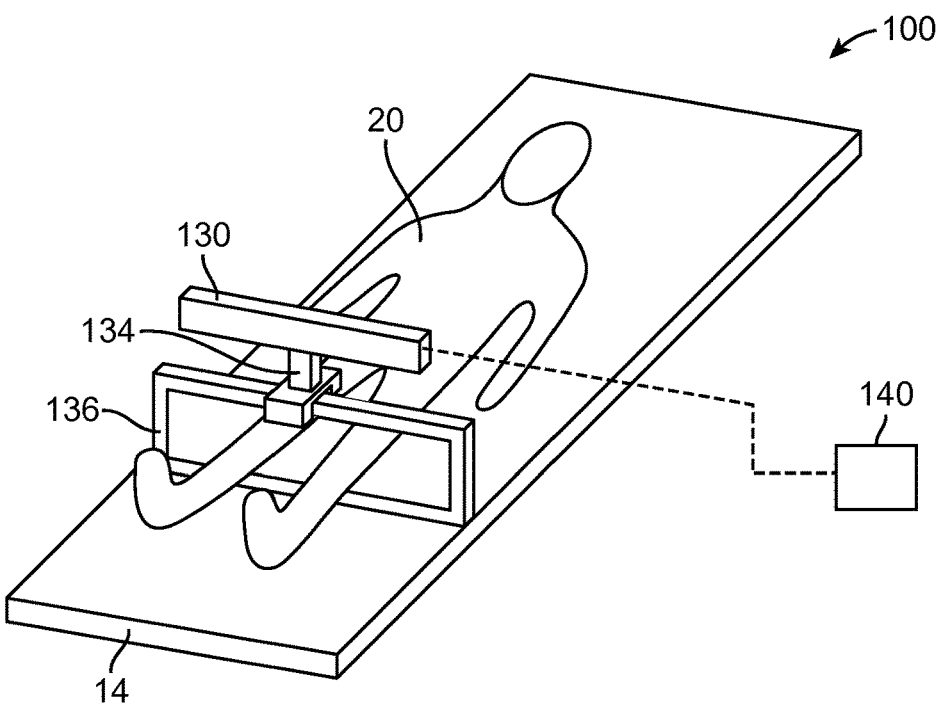
FIG. 1C illustrates a variation of the system of FIG. 1B.

In the illustrated embodiments, the securing mechanism 132 is configured to secure the depth measuring camera 130 to a bracket 136 at the foot of the support 14. The bracket 136 may be considered as a part of the collision detection system 100 in some embodiments. Alternatively, the bracket 136 may be considered as a part of the patient support 14. In some embodiments, the bracket 136 may have an opening to allow the patient's feet to go through it if necessary (FIG. 1C). For example, the bracket 136 may have an opening height that is more than 8 inches, such as 10 inches, 12 inches, 14 inches, etc., in order to allow the patient's feet to enter therethrough.

In other embodiments, the bracket 136 is optional, and the securing mechanism 132 may be configured to secure the depth measuring camera 130 directly to the patient support 14, or to other component(s) of the medical system 10. In further embodiments, the securing mechanism 132 may be configured to secure the depth measuring camera 130 to a room, such as to a ceiling, a wall, or a floor. In still further embodiments, the securing mechanism 132 may be configured to secure the depth measuring camera 130 to a structure that is not a part of the medical system 10. The securing mechanism 132 may be a clamp for grasping an object, a screw for insertion into a screw slot located in an object to which the depth measuring camera 130 is to be secured against, a snap-and-fit type connector, a hook-and-loop type connector, or any of other types of securing mechanism. In still further embodiments, the securing mechanism 132 is not required, and the collision detection system 100 does not include the securing mechanism 132. For example, in other embodiments, the support 134 may be a base, and the base may be placed on a flat surface that supports the depth sensing camera 130 during use.

In the illustrated embodiments, the depth sensing camera 130 is mounted above the top surface of the support 14. The height of the depth sensing camera 130 may be adjustable so that the head of the patient 20 is visible over his/her belly. Also, the orientation of the depth sensing camera 130 may be adjustable to adjust a viewing angle (e.g., relative to a horizontal surface). It should be noted that mounting the depth sensing camera 130 so that its position is fixed relative to the support 14 is advantageous because such configuration allows the depth sensing camera 130 to move with the patient support 14 (and therefore the patient 20) irrespective of the movement of the support 14.

As shown in FIGS. 1B and 1C, the collision detection system 100 also includes a processing unit 140 communicatively coupled to the depth sensing camera 130. The processing unit 140 is configured to process signals transmitted from the depth sensing camera 130, and to determine whether there is a possible collision between the patient and an object based on the signals. In some embodiments, the processing unit 140 may be a processor, such as an ASIC processor, a FPGA processor, a general purpose processor, or any of other types of processor. Also, the processing unit 140 may include hardware, software, or combination of both. Also, in some embodiments, the processing unit 140 may be the same as the processing unit 54, or a component of the processing unit 54. In other embodiments, the processing unit 140 may be considered to be a part of the treatment system 10, and not a part of the collision detection system 100.

Figure 2:
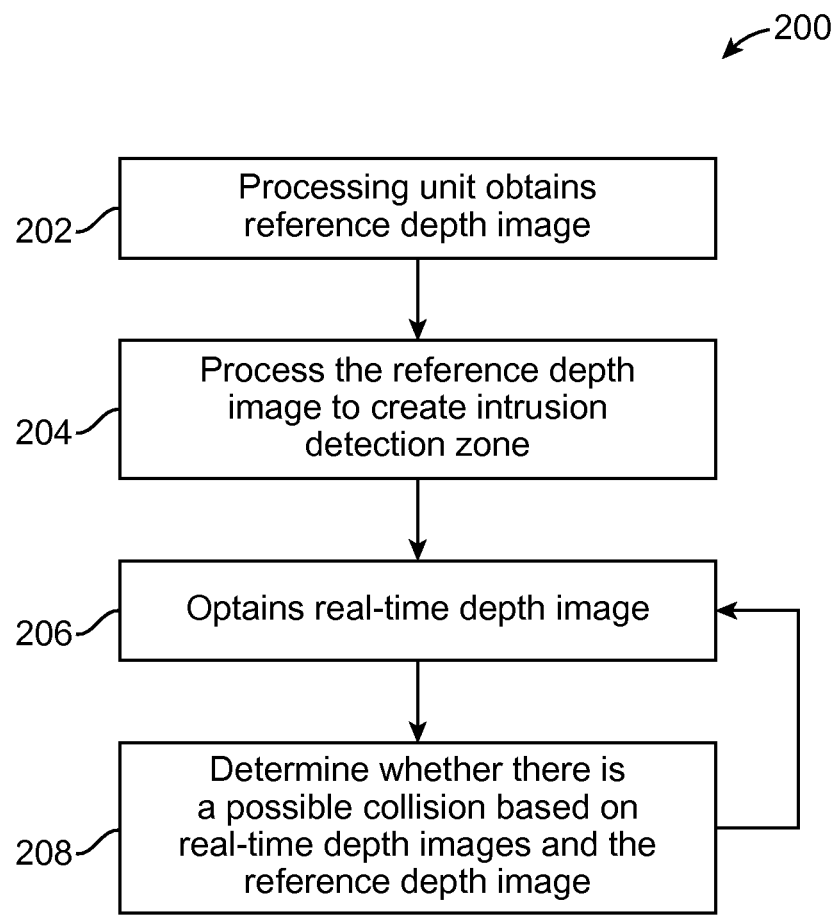
FIG. 2 illustrates a method for determining whether there is a possible collision between a patient and an object in accordance with some embodiments.

FIG. 2 illustrates a method 200 for determining whether there is a possible collision using the system 100 in accordance with some embodiments. First, the patient 20 is placed on the patient support 14, and is positioned in a desired location relative to the treatment system 10 in a patient setup procedure. Also, the depth sensing camera 130 is mounted so that its position is fixed relative to the support 14. The height of camera 130 and its orientation are then adjusted such that the camera 130 is looking towards the patient body (e.g., from one end where the feet are located towards the head, or vice versa), and can capture images of areas surrounding the patient 20.

Figure 3A:
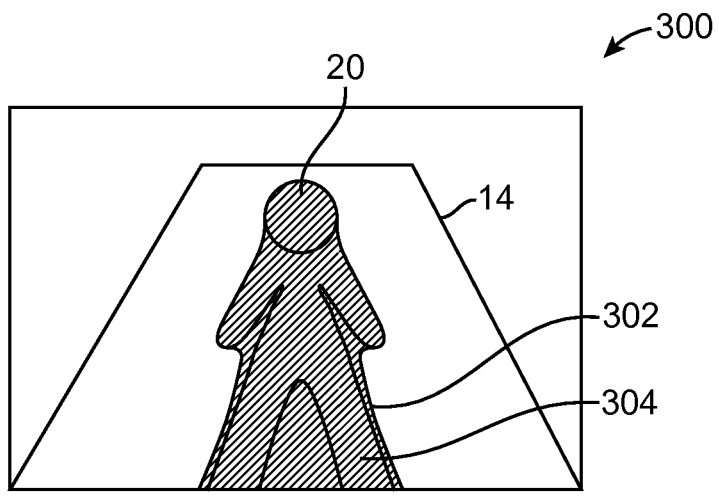
FIG. 3A illustrates an example of a reference image.
Figure 3B:
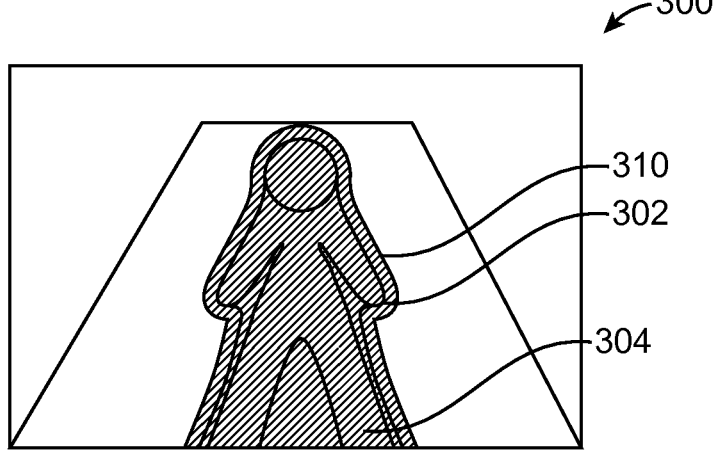
FIG. 3B illustrates an example of an intrusion detection zone based on a reference image.
Figure 3C:
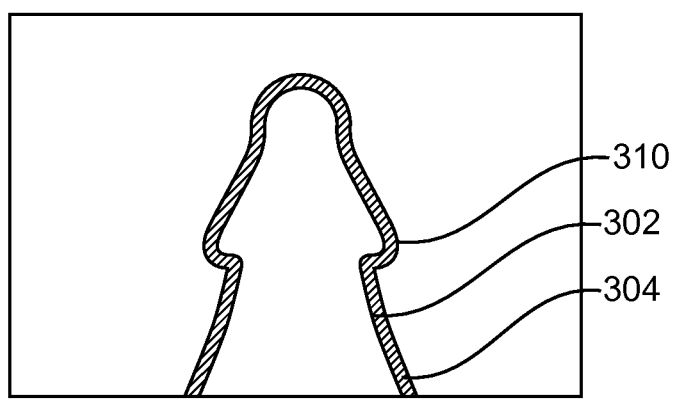
FIG. 3C illustrates another example of an intrusion detection zone based on a reference image.

After the patient setup procedure is completed, the depth sensing camera 130 is activated to capture a reference depth image while the patient 20 is on the support 14. As used in this specification, the term "image" may refer to any group of data (e.g., depth values), which may or may not be displayed in image form. For example, the data may be stored in a non-transitory medium, and/or may be processed by the processing unit 140 without being displayed to a user for viewing. The reference depth image is then transmitted to the processing unit 140. After the processing unit 140 obtains the reference image (item 202), the processing unit 140 then processes the reference image to create one or more intrusion detection zone (item 204). In some embodiments, the intrusion detection zone(s) may be stored in a non-transitory medium for later processing. FIG. 3A illustrates an example of a reference image 300 generated using the depth sensing camera 130. As shown in the example, the reference image 300 includes an outline/boundary 302 of the patient 20. In some embodiments, the boundary 302 of the patient 20 may be identified automatically by the processing unit 140 using image processing techniques. In other embodiments, the boundary 302 of the patient 20 may be determined manually by a user, who views the depth image, manually identifies the patient boundary 302, and draws the boundary 302 using a graphical user interface. In some embodiments, all of the area in the reference image within the outline 302 may be considered an intrusion detection zone 304. Thus, the intrusion detection zone 304 may be considered a portion of the reference depth image. In other embodiments, the processing unit 140 may generate a larger outline 310 surrounding the patient outline 302, and the area within the larger outline 310 may be considered an intrusion detection zone 304 (FIG. 3B). In some embodiments, the width between the patient outline 302 and the larger outline 310 may be determined to account for possible patient movement and safety margin. In further embodiments, the processing unit 140 may perform an image logical subtraction between the area formed by the larger outline 310 and the area formed by the patient outline 302, and the difference image may then be used as an intrusion detection zone 304 (FIG. 3C). As shown in the figure, in such cases, the intrusion detection zone 304 includes only a strip of the buffer area around the patient outline 302. In further embodiments, the intrusion detection zone 304 may be defined as the area in the reference depth image between the expanded larger outline 310, and a smaller outline that is contracted from the patient outline 302. It should be noted that as used in this specification, the term "reference depth image" may refer to the entire frame captured by the camera 130, or may refer to a subset of the entire frame captured by the camera 130 (such as an intrusion detection zone 304). Also, in some embodiments, the intrusion detection zone 304 itself may be considered a reference depth image.

In some cases, if the system 10 includes the monitor 56, the depth image provided by the camera 130, and/or the intrusion detection zones 304 generated by the processing unit 140, may be displayed on the monitor 56.

It should be noted that the outline for creating the intrusion detection zone 304 is not limited to that of a patient, and that the outline may include at least a part of a device, such as a part of a treatment machine and/or a patient support. In other embodiments.

Returning to FIG. 2, after the intrusion detection zone 304 is created, a treatment procedure may then begin. In some embodiments, the treatment procedure is carried out using the system 10 of FIG. 1. In such cases, the gantry 12 may be rotated around the patient 20, and the radiation source 22 may deliver radiation from different gantry angles towards the patient 20. During the treatment procedure, the depth sensing camera 130 captures a real time (input) depth image and transmits the real time image to the processing unit 140. As used in this specification, the term "input depth image" or "real time depth image" may refer to the entire frame captured by the camera 130, or may refer to a subset of the entire frame (such as an area that corresponds with the intrusion detection zone 304). The processing unit 140 receives the real time depth image (item 206), and determines whether there is a possible collision based on the real time depth image and the intrusion detection zone 304 (item 208). Because the intrusion detection zone 304 includes at least a portion of the reference depth image, or is derived from the reference depth image, or may be considered to be a feature in the reference depth image, or may be considered a reference depth image itself, the determination of a possible collision may also be considered as basing on at least a part of the reference depth image. Items 206-208 are repeated so that the processing unit 140 receives multiple real time depth images at different times during the treatment procedure, and determines whether there is any possible collision based on those real time depth images during the course of the treatment procedure.

Figure 4:
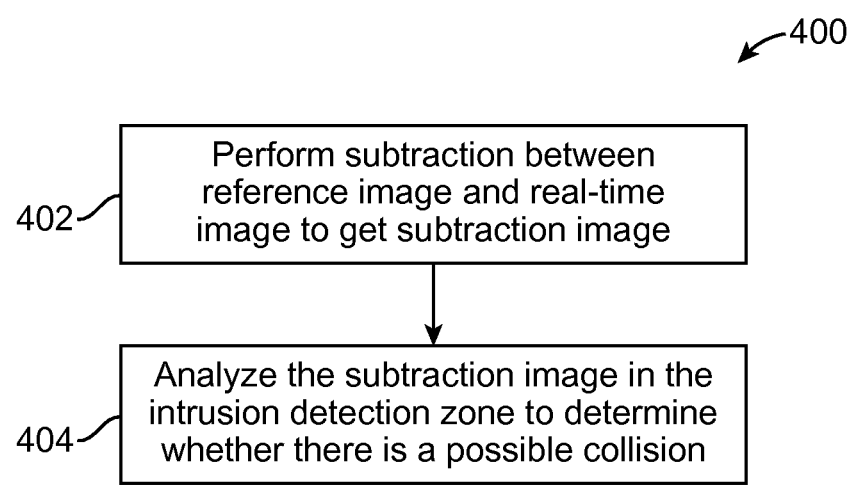
FIG. 4 illustrates a method of comparing a reference depth image with a real time depth image to determine whether there is a possible collision between a patient and an object.

FIG. 4 illustrates a method 400 to implement item 208 in some embodiments. During the treatment procedure, after the processing unit 140 receives a real time depth image, the processing unit 140 compares the real time depth image with the reference depth image by performing a subtraction between the reference depth image and the real time depth image to get a subtraction image (item 402). In some embodiments, the act of comparing the real time depth image with the reference depth image may be performed by comparing a portion of the real time depth image corresponding to the area of the intrusion detection zone 304, with a portion of the reference depth image where the intrusion detection zone 304 is located. The processing unit 140 then analyzes the subtraction image in the intrusion detection zone 304 to determine whether there is a possible collision (item 404). In the illustrated embodiments, the processing unit 140 determines that there is a possible collision between the patient 20 and an object when a difference between the reference depth image and the real time depth image falls below certain specified threshold. In some embodiments, the difference may be obtained by subtracting the real time depth image from the reference depth image, or vice versa. Also, in some embodiments, an absolute difference of the pixel values may be used so that it does not matter whether the real time depth image is subtracted from the reference depth image or vice versa.

Figure 5A:
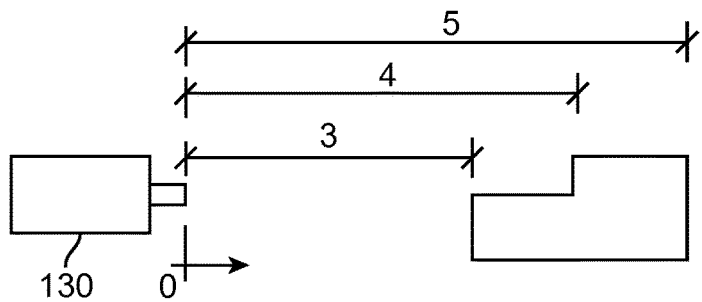
FIGS. 5A-5D illustrate a method for detecting a possible collision based on image processing.
Figure 5B:
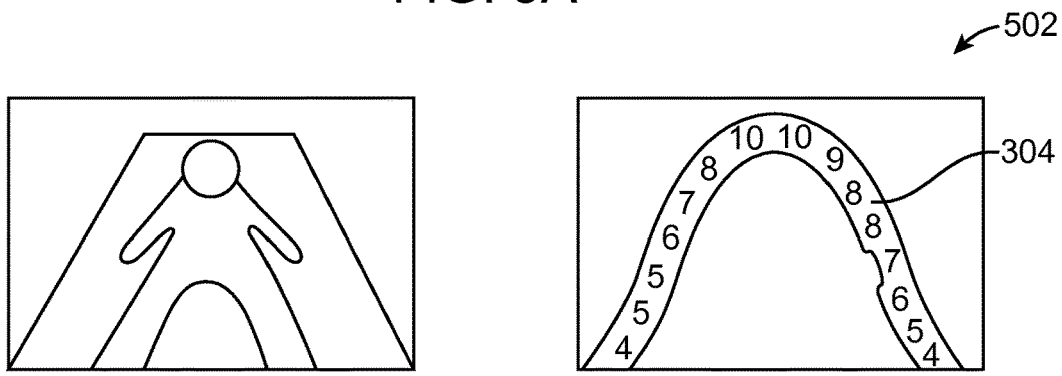
Figure 5C:
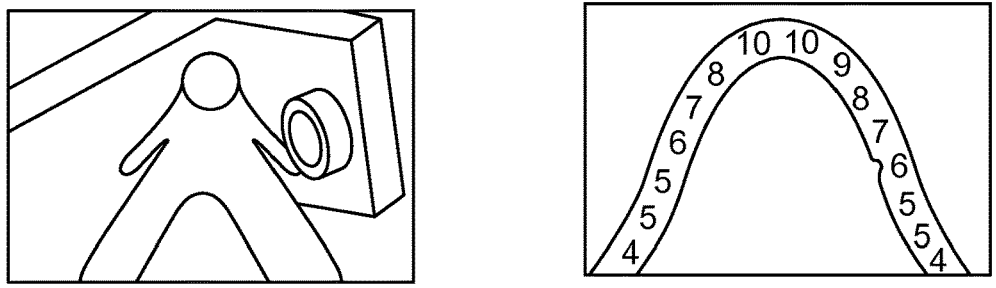

FIGS. 5A-5C illustrate an example of the method 400, and how an image subtraction between an input depth image and the reference depth image may be used to detect a possible collision. Because the depth sensing camera 130 is configured to sense depth, the two-dimensional image it produces has an array of pixel values that indicate respective distances between the camera 130 (i.e., the sensors in the camera 130) and different objects (or different parts of an object). For example, as shown in FIG. 5A, an arbitrary origin may be set to be at the camera, and so an object that is further away from the camera 130 will have a corresponding sensed depth by the camera 130 that has a higher value than another object that is closer to the camera 130. Thus, a pixel with a smaller value indicates that the sensed object is closer to the depth sensing camera 130 compared to a pixel that has a larger value.

FIG. 5B shows an example of a reference depth image 502 having an intrusion detection zone 304 represented by pixel values that is generated using the depth sensing camera 130 and the processing unit 140. The reference depth image 502 may be generated before a treatment session, or during the treatment session. In the example, the reference depth image 502 is generated by using a depth image from the depth sensing camera 130 positioned near a foot of the patient 20 and looking towards the head of the patient 20, like that shown in FIGS. 1B/1C, and by processing the depth image using the processing unit 140 to create an intrusion detection zone 304 (which has a shape that looks like that shown in FIG. 3C). The pixel values near the top of the intrusion detection zone 304 in the reference depth image 502 have relatively higher values because they correspond with the location where the head of the patient 20 is located, which is further away from the depth sensing camera 130. On the other hand, the pixel values near the bottom of the intrusion detection zone 304 in the reference depth image 502 have relatively lower values because they correspond with the location where the feet of the patient 20 are located, which are closer towards the depth sensing camera 130. Thus, the intrusion detection zone 304 is "three-dimensional" in the sense that it represents a region in a three-dimensional space for which collision detection is to be performed. In the illustrated example, the intrusion detection zone 304 has one strip of pixel values along the outline of the intrusion detection zone 304. In other embodiments, there may be more pixels in the intrusion detection zone 304, depending on how wide the intrusion detection zone 304 is set. Also, in other embodiments, instead of having one intrusion detection zone 304, the processing unit 140 may be configured to, or a user may, determine multiple intrusion detection zones 304. In some embodiments, one or more two-dimensional masks may be applied to the depth image from the depth image camera 130 to create the one or more detection zones 304 for the reference depth image 502.

FIG. 5C shows a real time input depth image 504 represented by pixel values that are generated using the depth sensing camera 130 and the processing unit 140. The real time depth image 504 is generated during the treatment session. Only values corresponding to the detection zone 304 are presented because the processing unit 140 is configured to analyze signals in the detection zone 304 for detecting possible collision. However, it should be understood that a complete real time input depth image 504 may include a two dimensional array of values that correspond to the view of the depth sensing camera 130. In other embodiments, the detection zone 304 may include all pixel values within the patient outline 302 (like that shown in FIG. 3A), or within the margin 310 (like that shown in FIG. 3B), in which cases, there will be pixel values in the middle region of the detection zone 304. Thus, as used in this specification, the term "input depth image" or "real time input depth image" may refer to the entire frame provided by the camera 130 or a subset of such entire frame (e.g., an area that corresponds to the intrusion detection zone 304).

Figure 5D:
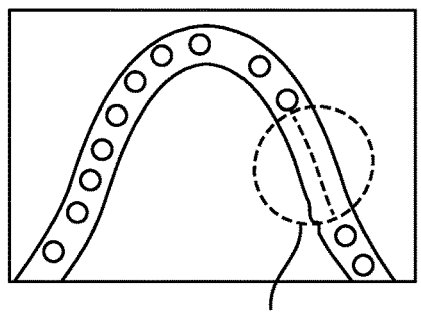

In the illustrated example, during treatment, the processing unit 140 subtracts depth values corresponding to the intrusion detection zone 304 in the real time depth image 504 from the depth values in the intrusion detection zone 304 in the reference depth image 502 in order to detect a possible collision. FIG. 5D shows the result of the subtraction. A detection of possible collision has occurred when the difference in value between the reference depth image 502 and the real time depth image 504 falls below a certain threshold. In the illustrated example, the threshold is set as 2, which may be stored in a non-transitory medium for use by the processing unit 140. Thus, any subtraction values with a number less than 2 represent a situation in which an object is too close to the patient to imply that a possible collision may be about to happen. As shown in the figure, some of the pixel values in the intrusion detection zone 304 in the subtraction image 506 have a value of 1, which is below the prescribed threshold of 2. When that occurs, the processing unit 140 may determine that there is a possible collision that may be about to happen. This is because when a moving object (such as the arm gantry 12, the radiation source 22, or the collimator 24 of the treatment system 10) is moving towards the patient 20, the object may appear within the field of view by the camera 130, and may be closer to the camera 130 than the patient 20 based on the position of the camera 130 (like the situation shown in the left of FIG. 5C). Thus, a depth value in the intrusion detection zone 304 representing the depth from the camera 130 to the detected colliding object will be less than the depth value in the same point of the intrusion detection zone 304 in the reference image (i.e., when the colliding object is not present). As a result, when the real-time depth image (with the colliding object detected) is subtracted from the reference depth image, the difference value will be a positive number. The difference value represents a proximity between the detected colliding object and the patient 20. If the detected object is far from the patient 20, the difference value will have a relatively larger value. On the other hand, if the detected object is moved so that it is closer to the patient 20, the difference value will have a relatively smaller value. If the difference value is below the prescribed threshold, it may represent the situation in which the detected moving object is too close to the patient to imply a possible collision that may be about to take place. Thus, as illustrated in the above example, the processing unit 140 may be configured to determine a possible collision by examining the values (intensity) of the various difference values in the intrusion detection zone 304 to see if a threshold has been violated.

In the illustrated embodiments, the processing unit 140 is configured to automatically detect a possible collision. In other embodiments, a user may also participate in determining whether there is a possible collision. For example, in some cases, the monitor 56 may be used to continuously display the real time depth images and/or the subtraction images representing comparisons of the reference depth image and the real time depth images during the procedure, so that the person operating the treatment procedure may view the images and identify possible collisions.

In some embodiments, when the processing unit 140 determines that there is a possible collision that may be about to happen, the processing unit 140 may generate a signal to stop the treatment system 10, generate a visual and/or audio warning signal, or a combination of the above.

It should be noted that the pixel values are arbitrarily chosen based on a certain coordinate frame (e.g., located at the depth sensing camera 130 so that the coordinate is 0 at the camera). In other embodiments, the pixel values in the reference depth image and the real time depth images may be based on other coordinate frames. For example in other embodiments, the pixel values in an image may be based on a coordinate frame so that a pixel with a smaller value indicates that the sensed object is further from the camera 130 compared to a pixel that has a larger value.

Also, in other embodiments, instead of subtracting the real time depth image 504 from the reference depth image 502, the processing unit 140 may be configured to subtract the reference depth image 502 from the real time depth image 504. In such cases, the processing unit 140 may be configured to determine that a possible collision may be about to occur if there is a difference pixel value in the intrusion detection zone 304 that is above a certain prescribed threshold, such as −2 in the illustrated example. Following the above example, if the reference depth image 502 is subtracted from the real time depth image 504, some of the difference pixel values in the intrusion detection zone 304 will have a value of −1, which is higher than the threshold of −2. In such cases, the processing unit 140 may then determine that a possible collision may be about to happen. Also, as discussed, in some embodiments, an absolute difference of the pixel values may be used so that it does not matter whether the real time depth image is subtracted from the reference depth image or vice versa.

In some embodiments, the depth sensing camera 130 may have the ability to acquire optical images (e.g., infrared or visible images), simultaneously in addition to depth images. In other embodiments, there may be two separate cameras, one capturing depth images and the other capturing optical images. If depth and optical images are both acquired during the procedure, the processing unit 140 may display both images next to each other on the monitor 56, or superimpose the two images on top of each other, to show how the depth image corresponds with the optical image. Also, in some embodiments, the processing unit 140 may perform analysis using optical images to determine whether there is a possible collision. For example, in some embodiments, the camera 130 may capture an infrared image (i.e., based on infrared emitter of the depth camera) of the patient 20 after the patient 20 has been set up on the support 14, and the infrared image is then transmitted to the processing unit 140 for use as a reference image. During a treatment procedure, real-time infrared input images are provided by the camera 130, and are transmitted to the processing unit 140. The processing unit 140 may compare the real-time infrared images with the reference infrared image to determine whether there is a possible collision that may be about to happen.

In some embodiments, both optical images and depth images may be used by the processing unit 140 to determine whether there is a possible collision. For example, in some embodiments, both the reference depth image and a reference optical image may be provided by the camera 130 (or by separate depth sensing camera and optical image capturing camera). The reference depth image and the reference optical image may be generated at the same time or at different respective times. During a treatment procedure, real-time optical input images and real-time depth images are provided by the camera(s), and are transmitted to the processing unit 140. The processing unit 140 may compare the real-time optical images with the reference optical image, as well as the real-time depth images with the reference depth image, to determine whether there is a possible collision that may be about to happen. For example, the processing unit 140 may compare real-time optical image V1 generated at time t1 with the reference optical image RV, as well as real-time depth image D1 generated at time t1 with the reference depth image RD, to determine whether there is a possible collision for time t1. Then, the processing unit 140 may compare real-time optical image V2 generated at time t2 with the reference optical image RV, as well as real-time depth image D2 generated at time t2 with the reference depth image RD, to determine whether there is a possible collision for time t2. As treatment continues, the processing unit 140 processes the images at different times to continuously detect possible collision.

As discussed, in some embodiments, the camera 130 may use an infrared emitter (illuminator), and the infrared images from which the depth data are derived may be output to the processing unit 140. In some embodiments, both the infrared images and depth images may be used by the processing unit 140 to determine whether there is a possible collision. For example, in some embodiments, both the reference depth image and a reference infrared image may be provided by the camera 130 (or by separate depth sensing camera and infrared camera). The reference depth image and the reference infrared image may be generated at the same time or at different respective times. During a treatment procedure, real-time infrared input images and real-time depth images are provided by the camera(s), and are transmitted to the processing unit 140. The processing unit 140 may compare the real-time infrared images with the reference visible image, as well as the real-time depth images with the reference depth image, to determine whether there is a possible collision that may be about to happen. For example, the processing unit 140 may compare real-time infrared image F1 generated at time t1 with the reference infrared image RIF, as well as real-time depth image D1 generated at time t1 with the reference depth image RD, to determine whether there is a possible collision for time t1. Then, the processing unit 140 may compare real-time infrared image F2 generated at time t2 with the reference infrared image RIF, as well as real-time depth image D2 generated at time t2 with the reference depth image RD, to determine whether there is a possible collision for time t2. As treatment continues, the processing unit 140 processes the images at different times to continuously detect possible collision.

In some embodiments, the real-time optical image is subtracted from the reference optical image, or vice versa. However the intrusion zone mask derived from the reference depth image is used as the region of interest (ROI) imposed on the subtraction image in order to check whether the absolute value of the pixels of the subtraction image exceeds a threshold. In other words, the depth image is used to determine a ROI for analyzing the optical image. This is especially effective when the optical image is produced by the camera infrared emitter, and therefore is not vulnerable to changing shadows created by the room ambient light and moving parts of the device.

Figure 6:
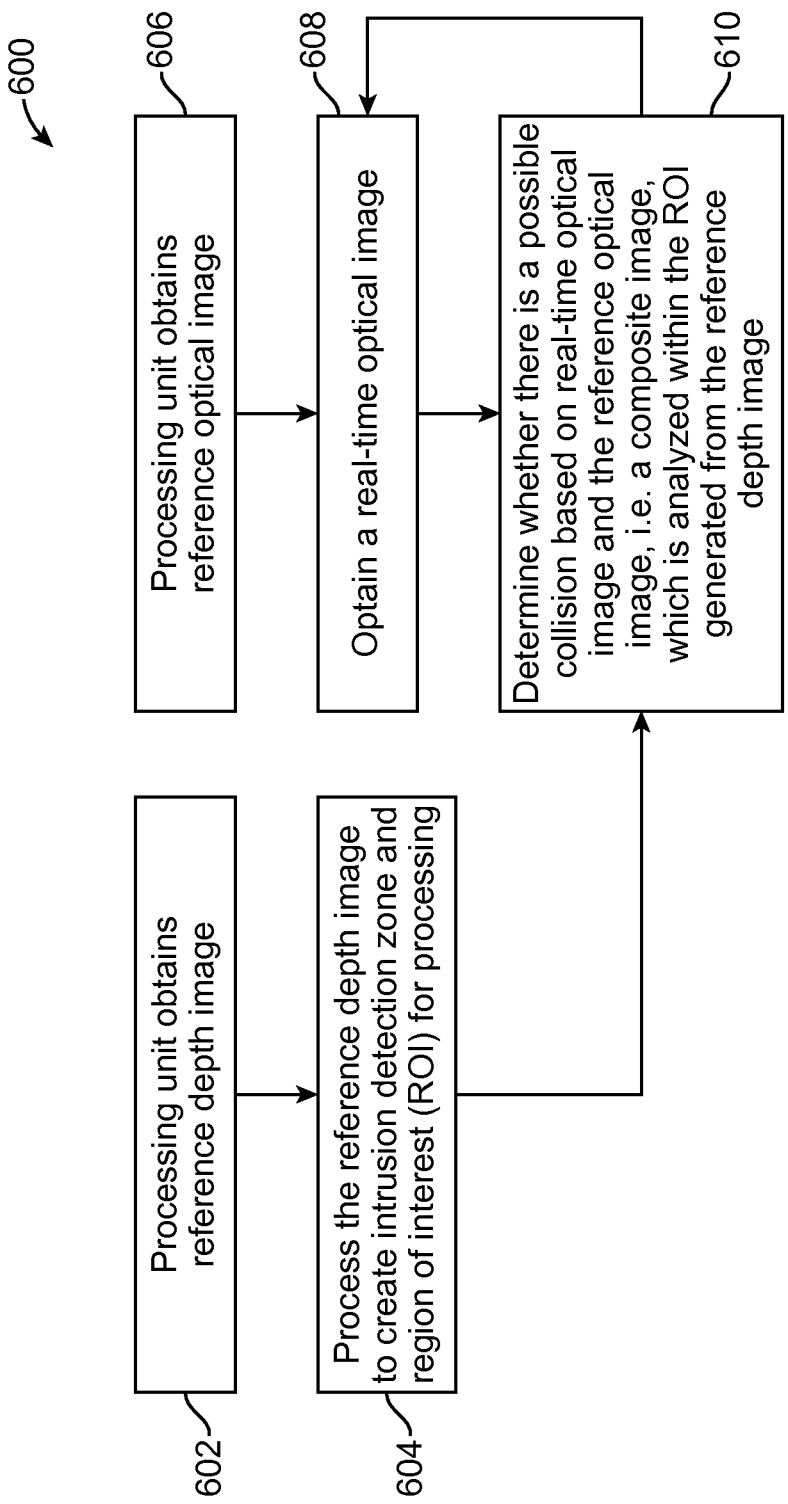
FIG. 6 illustrates a method for determining whether there is a possible collision between a patient and an object in accordance with other embodiments.

Thus, as shown in FIG. 6, in some embodiments, a method 600 of detecting a possible collision in a medical procedure, includes: obtaining a reference depth image (item 602); using the reference depth image to determine a region of interest (item 604); obtaining a reference optical image (e.g., visible image, or infrared image) (item 606); obtaining an input optical image (item 608); and determining whether there is a possible collision between an object and a patient based on the optical image and the reference optical image (item 610). In some embodiments, item 610 may be implemented by determining a composite image using the reference optical image and the input optical image, wherein the act of determining the composite image is performed using a processing unit. The processing unit may then determine whether there is a possible collision between an object and a patient based on at least a part of the composite image that corresponds with the region of interest. In some embodiments, the act of obtaining the reference depth image may be achieved by the processing unit receiving the reference depth image. In other embodiments, the act of obtaining the reference depth image may be achieved by a depth sensing camera generating the reference depth image. Similarly, in some embodiments, the acts of obtaining the reference optical image and the input optical image may be achieved by the processing unit receiving these images. In other embodiments, the acts of obtaining the reference optical image and the input optical image may be achieved by an optical camera generating these images. Also, in some embodiments, the composite image may be determined by the processing unit performing an image subtraction between the reference optical image and the input optical image. In addition, in some embodiments, the region of interest may be determined in the same or similar manner as that for the intrusion detection zone 304 discussed previously. Furthermore, in some embodiments, the act of determining whether there is a possible collision includes determining whether an absolute value of a pixel in the composite image exceeds a threshold. The pixel in the composite image may correspond to a position in the region of interest (which region of interest is imposed on the composite image). In still further embodiments, the act of obtaining input optical image may be repeated to obtain additional input optical images (e.g., real time optical images). Also, the act of determining composite image may be repeated for the additional input optical images to obtain additional composite images, and the act of determining whether there is a possible collision that is about to take place may be repeated based on the additional composite images during the course of a medical procedure. This way, during the medical procedure, the patient may be monitored in real time to prevent an object from colliding against the patient.

In one or more embodiments, the depth image and the optical image may be superimposed/overlaid to obtain a composite image that shows both depth and visible image.

In the above embodiments, the intrusion detection system 100 is described as having one depth sensing camera 130. In other embodiments, the intrusion detection system 100 may include multiple depth sensing cameras 130 to provide better coverage of the areas surrounding the patient 20.

In should be noted that the collision detection system 100 is not limited to being used during treatment by a radiation treatment device, and may be used in other types of treatment procedures, or any of other types of procedures which may or may not involve radiation.

Computer System Architecture

Figure 7:
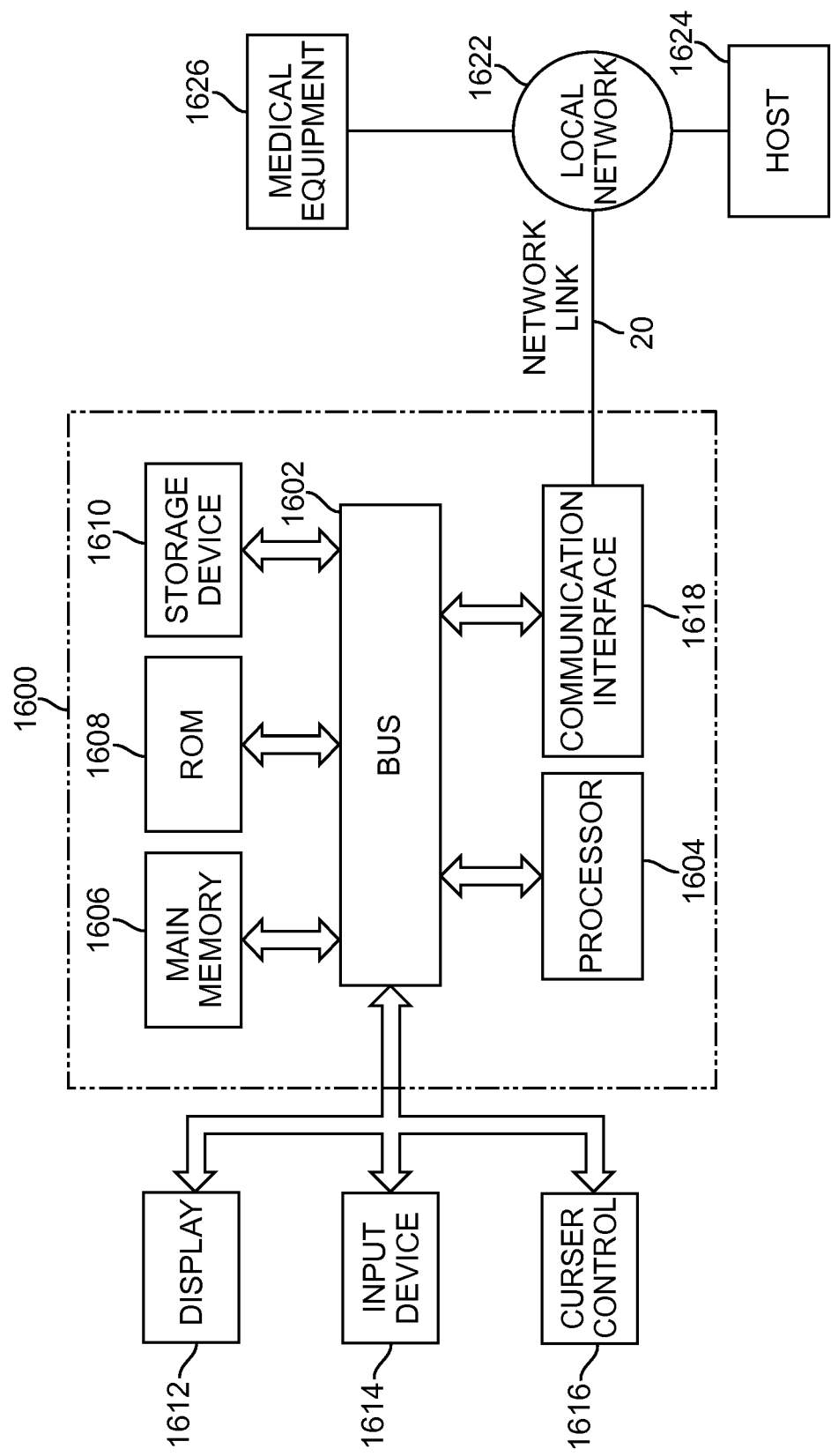
FIG. 7 illustrates a computer system with which embodiments described herein may be implemented.

FIG. 7 is a block diagram illustrating an embodiment of a computer system 1600 that can be used to implement various embodiments described herein. For example, the computer system 1600 may be configured to implement the method of FIG. 2 in accordance with some embodiments. Also, in some embodiments, the computer system 1600 may be used to implement the processing unit 140 of FIG. 1B and/or the processing unit 54 of FIG. 1A. Computer system 1600 includes a bus 1602 or other communication mechanism for communicating information, and a processor 1604 coupled with the bus 1602 for processing information. The processor 1604 may be an example of the processor 54 of FIG. 1A, an example of the processor 80 of FIGS. 1B/1C, or an example of any processor described herein. The computer system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The computer system 1600 further includes a read only memory (ROM) 1608 or other static storage device coupled to the bus 1602 for storing static information and instructions for the processor 1604. A data storage device 1610, such as a magnetic disk or optical disk, is provided and coupled to the bus 1602 for storing information and instructions.

The computer system 1600 may be coupled via the bus 1602 to a display 167, such as a cathode ray tube (CRT), for displaying information to a user. An input device 1614, including alphanumeric and other keys, is coupled to the bus 1602 for communicating information and command selections to processor 1604. Another type of user input device is cursor control 1616, such as a mouse, a trackball, or cursor direction keys for communicating direction information and command selections to processor 1604 and for controlling cursor movement on display 167. This input device typically has two degrees of freedom in two axes, a first axis (e.g., x) and a second axis (e.g., y), that allows the device to specify positions in a plane.

In some embodiments, the computer system 1600 can be used to perform various functions described herein. According to some embodiments, such use is provided by computer system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another computer-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "computer-readable medium" as used herein refers to any medium that participates in providing instructions to the processor 1604 for execution. Such a medium may take many forms, including but not limited to, non-volatile media, volatile media, and transmission media. Non-volatile media includes, for example, optical or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes coaxial cables, copper wire and fiber optics, including the wires that comprise the bus 1602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1604 for execution. For example, the instructions may initially be carried on a magnetic disk of a remote computer. The remote computer can load the instructions into its dynamic memory and send the instructions over a telephone line using a modem. A modem local to the computer system 1600 can receive the data on the telephone line and use an infrared transmitter to convert the data to an infrared signal. An infrared detector coupled to the bus 1602 can receive the data carried in the infrared signal and place the data on the bus 1602. The bus 1602 carries the data to the main memory 1606, from which the processor 1604 retrieves and executes the instructions. The instructions received by the main memory 1606 may optionally be stored on the storage device 1610 either before or after execution by the processor 1604.

The computer system 1600 also includes a communication interface 1618 coupled to the bus 1602. The communication interface 1618 provides a two-way data communication coupling to a network link 1620 that is connected to a local network 1622. For example, the communication interface 1618 may be an integrated services digital network (ISDN) card or a modem to provide a data communication connection to a corresponding type of telephone line. As another example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626 such as a radiation beam source or a switch operatively coupled to a radiation beam source. The data streams transported over the network link 1620 can comprise electrical, electromagnetic or optical signals. The signals through the various networks and the signals on the network link 1620 and through the communication interface 1618, which carry data to and from the computer system 1600, are exemplary forms of carrier waves transporting the information. The computer system 1600 can send messages and receive data, including program code, through the network(s), the network link 1620, and the communication interface 1618.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A method of detecting a possible collision in a medical procedure, comprising:
obtaining a reference depth image, wherein the reference depth image comprises a two-dimensional image having multiple pixel values, one of the pixel values representing a sensed depth, wherein the reference depth image is generated using a time-of-flight technique;
obtaining an input depth image, wherein the input depth image is obtained using a camera that is positionally slaved to a patient support so that the camera is moveable in correspondence with a movement of the patient support;
determining a composite image using at least a part of the reference depth image and at least a part of the input depth image, wherein the act of determining the composite image is performed using a processing unit; and
determining whether there is a possible collision between an object and a patient based on the composite image;
wherein the method further comprises determining a detection zone by selecting a two-dimensional area in the reference depth image as the detection zone, wherein the selected two-dimensional area that is the detection zone is in a plane of the reference depth image.

2. The method of claim 1, wherein the reference depth image is generated using infrared illumination.

3. The method of claim 1, wherein the input depth image comprises a real-time depth image.

4. The method of claim 1, wherein the act of determining the composite image comprises performing a subtraction using the at least a part of the reference depth image and the at least a part of the input depth image.

5. The method of claim 1, wherein the part of the at least a part of the reference depth image comprises image data in the detection zone.

6. The method of claim 1, wherein the act of determining whether there is a possible collision comprises determining whether a value of an image data in the composite image is greater or less than a threshold.

7. The method of claim 1, further comprising obtaining an optical image of the patient, wherein the act of determining whether there is a possible collision between the object and the patient is based on both the composite image and the optical image.

8. The method of claim 1, further comprising obtaining an infrared image, wherein the act of determining whether there is a possible collision between the object and the patient is based on both the composite image and the infrared image.

9. The method of claim 1, further comprising generating a warning signal, generating a control signal to stop an operation of a medical device, or both, in response to the determined possible collision.

10. The method of claim 1, further comprising:
obtaining an additional reference depth image;
obtaining an additional input depth image; and
determining an additional composite image using at least a part of the additional reference depth image and at least a part of the additional input depth image.

11. The method of claim 10, wherein the camera comprises a first depth sensing camera, wherein the reference depth image and the input depth image are generated using the first depth sensing camera, and the additional reference depth image and the additional input depth are generated using a second depth sensing camera.

12. The method of claim 1, wherein the act of determining whether there is a possible collision comprises using the intrusion detection zone, wherein a shape of the intrusion detection zone is independent of a movement of a patient support supporting the patient.

13. The method of claim 1, wherein the camera is oriented to view the patient from inferior-to-superior.

14. The method of claim 1, wherein the selected two-dimensional area in the reference depth image includes a first two-dimensional area in the reference depth image that is outside an outline of the patient as captured in the reference depth image.

15. The method of claim 14, wherein the selected two-dimensional area in the reference depth image also includes a second two-dimensional area in the reference depth image that is inside the outline of the patient as captured in the reference depth image.

16. The method of claim 1, wherein the selected two-dimensional area that is the detection zone constitute an entirety of the detection zone.

17. The method of claim 1, further comprising using the selected two-dimensional area as the detection zone repeatedly during a period.

18. An apparatus for detecting a possible collision in a medical procedure, comprising:
   a depth sensing camera comprising time-of-flight sensors for providing a reference depth image, and an input depth image, wherein the reference depth image comprises a two-dimensional image having multiple pixel values, one of the pixel values representing a sensed depth, wherein the depth sensing camera is positionally slaved to a patient support so that the depth sensing camera is moveable in correspondence with a movement of the patient support; and
   a processing unit configured for:
      determining a composite image using at least a part of the reference depth image and at least a part of the input depth image, and
      determining whether there is a possible collision between an object and a patient based on the composite image;
   wherein the processing unit is further configured to determine a detection zone by selecting a two-dimensional area in the reference depth image as the detection zone, wherein the selected two-dimensional area that is the detection zone is in a plane of the reference depth image.

19. The apparatus of claim 18, wherein the depth sensing camera is configured to generate the reference depth image using infrared illumination.

20. The apparatus of claim 18, further comprising a securing mechanism for securing the depth sensing camera in a fixed position relative to a patient support.

21. The apparatus of claim 18, wherein the processing unit is configured for determining the composite image by performing a subtraction using the at least a part of the reference depth image and the at least a part of the input depth image.

22. The apparatus of claim 18, wherein the at least a part of the reference depth image comprises image data in the detection zone.

23. The apparatus of claim 18, wherein the processing unit is configured for determining whether there is a possible collision by determining whether a value of an image data in the composite image is greater or less than a threshold.

24. The apparatus of claim 18, wherein the processing unit is also configured to obtain a visible image of the patient, and wherein the processing unit is configured for determining whether there is a possible collision between the object and the patient based on both the composite image and the visible image.

25. The apparatus of claim 18, wherein the processing unit is also configured to obtain an infrared image, and wherein the processing unit is configured for determining whether there is a possible collision between the object and the patient based on both the composite image and the infrared image.

26. The apparatus of claim 18, wherein the processing unit is further configured for generating a warning signal, generating a control signal to stop an operation of a medical device, or both, in response to the determined possible collision.

27. The apparatus of claim 18, further comprising an additional depth sensing camera for generating an additional reference depth image and an additional input depth image;
   wherein the processing unit is configured for determining an additional composite image using at least a part of the additional reference depth image and at least a part of the additional input depth image.

28. The apparatus of claim 18, wherein the processing unit is configured to use the intrusion detection zone to determine whether there is a possible collision between the object and the patient, and wherein a shape of the intrusion detection zone is independent of a movement of a patient support supporting the patient.

29. The apparatus of claim 18, wherein the depth sensing camera is oriented to view the patient from inferior-to-superior.

30. The apparatus of claim 18, wherein the selected two-dimensional area in the reference depth image includes a first two-dimensional area in the reference depth image that is outside an outline of the patient as captured in the reference depth image.

31. The apparatus of claim 30, wherein the selected two-dimensional area in the reference depth image also includes a second two-dimensional area in the reference depth image that is inside the outline of the patient as captured in the reference depth image.

32. The apparatus of claim 18, wherein the selected two-dimensional area that is the detection zone constitute an entirety of the detection zone.

33. The apparatus of claim 18, wherein the processing unit is configured to use the selected two-dimensional area as the detection zone repeatedly during a period.

34. A method of detecting a possible collision in a medical procedure, comprising:
   obtaining a reference depth image, wherein the reference depth image comprises a two-dimensional image having multiple pixel values, one of the pixel values representing a sensed depth, wherein the reference depth image is generated using a time-of-flight technique;
   using the reference depth image to determine a region of interest;
   obtaining a reference optical image;
   obtaining an input optical image, wherein the input optical image is obtained using a camera that is positionally slaved to a patient support so that the camera is moveable in correspondence with a movement of the patient support;
   determining a composite image using the reference optical image and the input optical image, wherein the act of determining the composite image is performed using a processing unit; and
   determining whether there is a possible collision between an object and a patient based on at least a part of the composite image that corresponds with the region of interest;

wherein the method further comprises determining a detection zone based on the reference depth image, wherein an entirety of the detection zone is a two-dimensional area that is in a plane of the reference depth image.

35. The method of claim 34, wherein the reference optical image comprises a reference infrared image.

36. The method of claim 34, wherein the act of determining the composite image comprises performing an image subtraction.

37. The method of claim 34, wherein the act of determining whether there is a possible collision comprises determining whether an absolute value of a pixel in the composite image exceeds a threshold.

38. A system for detecting a possible collision in a medical procedure, comprising:
   a depth sensing camera comprising time-of-flight sensors for obtaining a reference depth image, wherein the reference depth image comprises a two-dimensional image having multiple pixel values, one of the pixel values representing a sensed depth;
   a camera for obtaining a reference optical image, and obtaining an input optical image, wherein the camera is positionally slaved to a patient support so that the optical camera is moveable in correspondence with a movement of the patient support; and
   a processing unit configured for
      using the reference depth image to determine a region of interest,
      determining a composite image using the reference optical image and the input optical image, and
      determining whether there is a possible collision between an object and a patient based on at least a part of the composite image that corresponds with the region of interest;
   wherein the processing unit is further configured for determining a detection zone based on the reference depth image, wherein an entirety of the detection zone is a two-dimensional area that is in a plane of the reference depth image.

39. The system of claim 38, wherein the reference optical image comprises a reference infrared image.

40. The system of claim 38, wherein the processing unit is configured to perform an image subtraction to determine the composite image.

41. The system of claim 38, wherein the processing unit is configured to determine whether an absolute value of a pixel in the composite image exceeds a threshold.

\* \* \* \* \*